March 10, 1942.  W. C. RODGERS  2,275,558
COMPOSITION FOR ELECTRICAL INSULATION AND OTHER TECHNICAL USES
Filed June 10, 1938  2 Sheets-Sheet 1
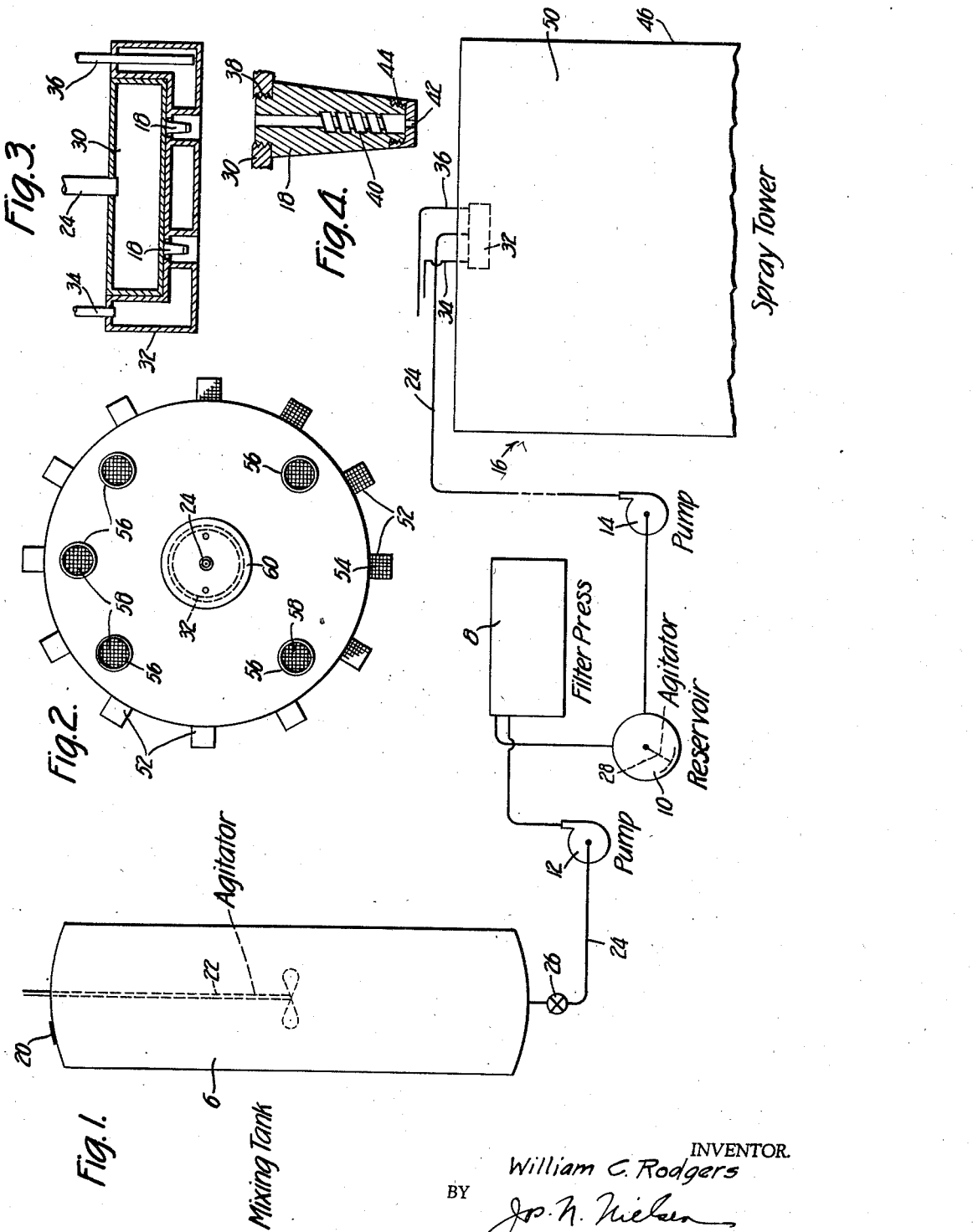
INVENTOR.
William C. Rodgers
BY
Jos. N. Nielsen
ATTORNEY.

March 10, 1942.      W. C. RODGERS      2,275,558
COMPOSITION FOR ELECTRICAL INSULATION AND OTHER TECHNICAL USES
Filed June 10, 1938      2 Sheets-Sheet 2

INVENTOR.
William C. Rodgers
BY
ATTORNEY.

Patented Mar. 10, 1942

2,275,558

UNITED STATES PATENT OFFICE 2,275,558

COMPOSITION FOR ELECTRICAL INSULATION AND OTHER TECHNICAL USES

William C. Rodgers, East Orange, N. J., assignor, by mesne assignments, to Halowax Corporation, a corporation of Michigan Application June 10, 1938, Serial No. 213,003

5 Claims. (Cl. 106—230)

This invention relates to wax-like compounds in a new and more usable form and to their production and utilization. The invention is particularly directed to such compounds containing several ingredients which have a tendency to stratify with separation of the ingredients. This stratification is very pronounced in some compounds as they cool or harden from the molten or fluid state to the solid state and it is also quite noticeable in some compounds if they are permitted to stand in the molten state. The objects of the invention, therefore, are the preparation of solid mixtures of this type which are uniform in composition and which remain uniform in composition when liquefied, and generally to improve the art to which this invention pertains, including materials for and the treatment of electrical apparatus.

While this invention relates to wax-like compounds suitable for a variety of purposes, it will be more particularly described with relation to compounds suitable for coating electrical conductors.

Application of wax-like coatings to electrical wiring is frequently made to impart flame-retardant properties to the covering. The useful wax-like coating compounds are frequently mixtures of a wide variety of different substances, as for example: asphalt, stearin pitch, halogenated naphthalenes, halogenated diphenyls, paraffin wax, halogenated rubber, ceresin, dyes, pigments, bees-wax, etc. Such materials differ widely, both in physical and chemical properties, and skillful blending is required to produce a coating compound of the correct softening point, appropriate viscosity, flexibility and distensibility, freedom from cracking, chipping or crazing, etc. Not only is careful formulation required, but the maintenance of the uniformity and homogeneity of the compound in the course of its application to the conductor is an important desideratum, and has presented a problem which has heretofore lacked a satisfactory solution in the case of mixtures of materials which stratify. In one aspect, the problem results from the methods commonly used for coating insulators, which involve melting the wax compounds and then passing the insulator through the molten wax. No matter how carefully the compounding of the composition may have been effected, there is always a tendency for one or more of the various components of the coating compound to segregate when the compound is reduced to the molten state and, as a result, a non-uniform, non-homogeneous coating may be deposited on the conductor. Attempts to overcome this by agitating the molten wax have proved unsatisfactory, such agitation having a tendency to introduce air into the compound, and a porous coating is frequently the result.

The problem of producing a uniform and homogeneous coating is aggravated by the fact that many important and useful compounds contain ingredients which attack the rubber or enamel insulation on a wire and these ingredients also present certain health hazards. These are in particular the chlorinated organic compounds which attack rubber and enamel and the vapors of which are prone to give rise to certain skin irritations.

In the actual coating of an electrical conductor of the usual type for instance one having a rubber insulation over the conductor and a fabric covering (that is a covering braided, woven, wound or otherwise constructed of cotton, paper, glass, asbestos, or other textile or fibrous substances) over the rubber, the conductor is dipped into a tank of the melted coating material. The desideratum is as small a bath as possible maintained at as low a temperature as possible yet effective to coat and impregnate the fabric covering. The small bath and low temperature are desirable as such a bath will give off less fumes than a large bath maintained at a higher temperature. The small bath is also desirable as it is easier to melt at the beginning of the day's work after cooling off and solidifying over night and it is easier to bring to a uniform condition after the materials have stratified by standing over night and cooling. But during the working day, it is very much more difficult to maintain uniform conditions in a small bath than in a large bath particularly where the small bath is maintained at a relatively low temperature. It is impractical to stir a small bath as this introduces air into the bath since the agitator will be quite near the surface of the bath. Furthermore, if the materials added to the bath to make up for those removed by the treated wire are not exceedingly uniform in composition, the composition of a small bath will change much more than will the composition of a large bath. Also the introduction of the materials tends to change the conditions of a small bath much more than a large bath, particularly the temperature of the bath which changes the viscosity and fluidity of the bath and this in turn changes the quantity of coating material absorbed by the fabric, the amount of impregnation of the fabric, the operation of the smoothing die, etc. The effect of only a slight change in temperature is more pronounced where, as in the case of coating compositions containing halogenated materials, the temperature of the bath is maintained as low as possible to prevent fumes and prevent the attack of the rubber by the chemicals and prevent deterioration of the rubber by the heat. With regard to the effect of changes in viscosity, fluidity and temperatures of the bath, some wires are permitted to remain in the molten bath for only two seconds and consequently the smallest change in the conditions of the bath greatly affects impregnation of the fabric, and some wires pass through the bath at the rate of approximately 1½ feet per second so that the smallest change in the condition of the coating as the wire emerges from the bath and passes through the smoothing die greatly affects the action of the die.

The problems of producing uniform and homogeneous coatings on conductors are more inclusive than merely coating the conductors; these problems extend back to the manufacture of the coating compositions themselves. The compositions as supplied to the wire manufacturer must be uniform and homogeneous and must be in a condition which facilitates their use by the wire manufacturer to overcome the difficulties of wire coating as previously pointed out. Also, as previously pointed out, many of these compositions contain halogenated compounds which present certain health hazards during their incorporation into the compositions as the vapors tend to affect a person's skin. Since the compounding of the coating compositions is usually effected by melting the various ingredients together at elevated temperatures and with sufficient agitation to give a uniform and homogeneous blend, this has usually necessitated exposing workmen to the vapors during the mixing, and a definite occupational health hazard results. These molten compounds must then be rapidly cooled; otherwise, the various ingredients often tend to segregate to give a non-uniform, non-homogeneous mass. Since the rapid cooling of large batches is difficult, this has usually necessitated the preparation of relatively small batches of material (for instance 130 lb. lots) or, alternatively, the preparation of large batches of material (for instance 2½ to 5 tons) which are subsequently discharged into smaller containers for rapid cooling. Both procedures militate against economical manufacture and involve certain health hazards, since the workmen at some stage in the operations usually are exposed to the vapors of the heated compositions. Moreover, it has been found that even when substantially homogeneous compounds are obtained by vigorous agitation and rapid cooling, such compounds tend to segregate when they are maintained in the molten condition for any considerable time.

In the present invention, these difficulties have been overcome by first compounding the coating ingredients at elevated temperature and then forming the material into individual droplets which harden into small pellets, for instance by subjecting the material to a spray cooling treatment by rapidly ejecting the mixture through a spray nozzle into a cooling chamber. When sprayed, the mixture solidifies in the form of small spherical or oval particles which are easily discharged through a hopper at the bottom of the cooling chamber into suitable containers. The spraying is preferably effected in such a manner that the droplets have a whirling motion during the change from the liquid to the solid state. During this cooling period two phenomena occur: one is that in the case of rather large pellets, say from about 2½ to about 5 mm. in diameter which normally take an appreciable time to cool, that is pellets which do not harden until near the bottom of the hereinafter described tower, the materials having the higher specific gravities tend to migrate to the surface of the particles and as the materials which have the highest melting points almost invariably have the highest specific gravities as they densify, the large pellets have an outer shell of the highest melting point material; the second phenomenon is that with smaller pellets say from about ½ to about 2½ mm. in diameter which cool and harden almost instantaneously throughout the entire mass, the ingredients solidify practically in situ with no appreciable shell or film formation and they show no evidence of segregation of the various ingredients but are exceedingly homogeneous. The shells or films on the larger particles are usually so thin that they can only be noticed under a microscope but they are remarkably efficient in preventing the particles from adhering in a package and they not only prevent the larger particles from adhering but if the smaller particles, in admixture with the larger particles, have a tendency to soften and cause adherence within the mass of particles, the films or shells form dividing surfaces so that the mass of particles easily separates into individual particles, for instance by a blow from the back of a shovel on a hundred pound sack of the particles.

However, when the particles are used in practical application, for instance when melted to form a wire treating bath or dissolved in lubricating oil for lubricants or milled into rubber, the microscopic film or shell is of negligible effect so far as uniformity of the bath or mixture is concerned, and in fact has a beneficial effect. When the particles are melted, the temperature of the bath need be maintained only slightly above the melting point of the composition since, when a filmed particle is added to the bath, heat passes through the film of high melting point material and liquefies the lower melting point materials in the center of the particle. These lower melting point materials melt at a lower temperature than the temperature of the bath and when in a liquid condition begin to dissolve the film of high melting point material from the inside. Thus the film of high melting point material gets thinner and thinner until finally it is entirely dissolved and the solid pellet has resumed its uniform composition which it had in the original mixing tank; consequently the bath is maintained uniform.

When milled into a plastic material which has rubber-like, elastic properties for instance rubber, neoprene, polyvinyl acetates at elevated temperatures, chlorinated rubber, rubber hydrochloride, hydrogenated rubber, derivatives of polyvinyl acetate, polyvinyl alcohols and their derivatives such as the mixed methylene vinyl acetates, phenol resins in the B state at elevated temperatures, it has been found that these spray cooled particles mix more quickly and easily, and produce a more uniform plastic mixture than do particles of the same size obtained by crushing or grinding the particles from a solid cake. This is believed to be due to the shape and condition of the particles and in the case of those particles which have a hard outer shell to the forces set up within the particle as it cools, particularly in the case of crystalline materials, which tend to shatter the particle when it is ruptured. With particles containing materials which are crystalline in the solid state and more particularly in the case of particles where the outer shell or film of the particle is a crystalline material, crystals begin to form as the pellet begins to cool and as the pellet continues to cool these crystals grow toward the center, the materials which solidify later in the process of cooling the pellet building up on the crystals which have already formed. Thus when the pellet has entirely solidified, it is a mass of crystals and thereafter when force is exerted on the pellet, for instance when it is milled into rubber, the pellet tends to shatter along the crystal faces formed during the solidification of the pellet; and thus the plastic contains extremely small sections of the compound which are parts of the small pellets of the compound broken along the crystal faces. There are a number of other advantages in using these particles in plastic mixes. The rubber or similar plastic and particles are usually mixed on rolls under heat which has a tendency to break down the rubber and the added compositions, giving hydrochloric acid in the case of chlorinated materials and deteriorating the rubber. With the quicker mixing there is less power used on the rolls, there is less heat developed and the materials are subjected to heat for a shorter time and thus there is less breakdown of the rubber (and consequently a lighter color which is important in colored wires), less acid developed, less opportunity for the dyes, pigments, or other coloring materials to be affected, etc.

The pelleted materials as described herein present distinct advantages when used as addition agents to lubricating oil. Heretofore solid chlorinated materials such as compounds containing chlorinated naphthalene have been supplied in metallic containers or large cakes from which chunks of the material have been separated. This separation has usually been done with an ax and chips of the material fly from the piece which, together with the use of the ax which is also used to split the metallic containers leaving ragged edges, offer a definite occupational hazard and result in an appreciable loss of material since foreign matter such as dirt, floor sweepings, etc. must be kept out of the oil. Furthermore, when the materials or compounds are formed into cakes or large masses which solidify in the containers, there is a tendency for the stratification to occur so that when chunks are cut off from the main piece, the material as added to the oil may not be uniform. Moreover, when solid chunks of the material (for instance either a relatively uniform material such as a halogenated naphthalene or a compound such as one of the chlorinated materials containing another ingredient for instance the solid esters, acids, soaps, etc.) are added to the oil they sink to the bottom of the mixing tank rather quickly, as their specific gravity is usually greater than that of the oil, and lie there until they melt or are dissolved. If the material is melted prior to being added to the oil, the problem of fumes again arises together with the cost of melting and the necessary equipment and handling. A friable material breaks from the main piece more readily than a material which is not thus characterized, but it still has all the disadvantages of chipping, etc. referred to. If any of the solid particles are ground to provide a small particle size, there is always the problem of dust which is injurious to the health of the workmen and there is a tendency for ground particles to melt together and agglomerate when put into the oil thus preventing a quick solving at a low temperature. Flaked materials cannot be made in small sizes as can spray cooled materials and they do not dissolve as quickly and tend to agglomerate. Heat breaks down oil making the oil thinner, produces carbon particles, darkens the color of the oil and reduces its lubricating properties; the heat also has a tendency to break down and adversely affect the majority of addition agents and it is desirable to get the addition agents into the oil as quickly and at as low a temperature as possible.

With the use of pelleted material, however, all of these disadvantages are overcome. The pellets can easily be stirred into and distributed through the oil whereas a chunk cannot and the pellets dissolve much more quickly than a chunk. By adding pellets there is absolute uniformity in the materials added and there are no chips or other occupational hazards. The pellets may be removed from the shipping container with a minimum of effort and wastage and without injuring the container or melting and with an entire absence of fumes or other health hazards. In the case of spray cooled compounded materials which have a shell of an ingredient which is of a relatively higher melting point than another ingredient, the shell tends to keep the particles separated and prevent agglomeration of the particles until they suddenly become liquid. Also the rounded spray cooled particles can be fed to the oil by automatic machinery much more easily than flaked or ground materials as the rounded particles do not adhere to the feeding apparatus. This is particularly noticeable with shelled particles in the portion of the feed device which is adjacent the hot oil and receives both the heat and fumes from the oil. Rounded spray cooled particles will be decidedly more free flowing than will flaked or ground particles and thus the feeding apparatus can be entirely automatic and totally enclosed. The fact that spray cooled particles can be gotten into the lubricating base more quickly and at a lower temperature than large lumps or crushed, ground or flaked material produces a lubricant with a lower and more controllable acid content and better extreme pressure qualities than usual. Thus the advantages of using addition agents as spray cooled particles can readily be understood, these advantages being noticeable in the manufacture of the addition agents, their preparation for and admixture with the oil as well as in the oil composition.

With regard to treating wire, when these particles are melted to form a wire treating bath, the uniformity is maintained in the bath, even in the molten state for as much as three hours or longer, thereby enabling the wire manufacturer to overcome the previous difficulties of a non-uniform melt. Thus, a representative spray cooled material, which had been maintained in a molten condition for about three hours, showed a variation of only 1° C. in flow point throughout the entire mass, whereas a similar material, not spray cooled, when maintained under the same conditions, showed a variation of as much as 6° C.

The spraying operations safeguard the health of the workmen, since the compounding can be done in large enclosed tanks, the fluid mix sprayed into enclosed towers, and the cooled pellets removed without exposing workmen to hazardous vapors.

When fused in a coating bath, the molten pellets not only maintain a uniformity and homogeneity of composition for a time sufficiently long that a uniform coating is deposited on the conductor, but the pellets permit uniform and controlled additions of the coating composition when it becomes necessary to replenish the coating bath. This is important and advantageous, since it is desirable in wire coating to maintain the coating bath at a temperature only slightly above the softening point of the composition, so that the composition will solidify almost instantly on the emerging wire. Consequently, if the additions of coating compositions can be made at a uniform and controlled rate—say, by feeding a regulated stream of pellets of uniform composition from a hopper—then the temperature of the bath is not abruptly lowered, as would be the case if larger solid fragments of the composition were introduced.

The spray cooled pellets have the further advantage of being dust-free and easy to package. The pellets are easily discharged from the package, since they are rounded in shape and do not readily deform and fuse together under ordinary storage conditions. These characteristics are especially important in comparing these particular pelleted materials with flake materials or hollow pellets as these same materials in flake form tend to fuse together and do not feed evenly into a coating bath and in both flake and hollow pellet form tend to produce the dust which is a health hazard and, in addition, the hollow pellets tend to introduce air into the bath. The herein described method of making small particles of these materials is particularly advantageous when the materials are relatively soft, as it is extremely costly or impractical to grind soft, waxy material to obtain small particles. Spray cooling of these materials also produces such a uniform particle size that screening is not required in the majority of cases; if, however, screening is resorted to, the operation is facilitated by the shape of the particles and can be accomplished more quickly and at a lower cost than with ground material. The dust incident to grinding and screening ground materials is also eliminated which is extremely important in connection with halogenated materials which, in some instances, present health hazards.

In order to more particularly disclose the invention, the process of spray solidifying a representative composition will be disclosed in connection with a suitable apparatus, shown in the accompanying drawings, in which Fig. 1 is a diagrammatic layout of the system.

Fig. 2 is a plan view of the spray tower on the line 2—2 of Fig. 5.

Fig. 3 is a section through the spray head reservoir.

Fig. 4 is a section through a spray nozzle.

Figure 5:
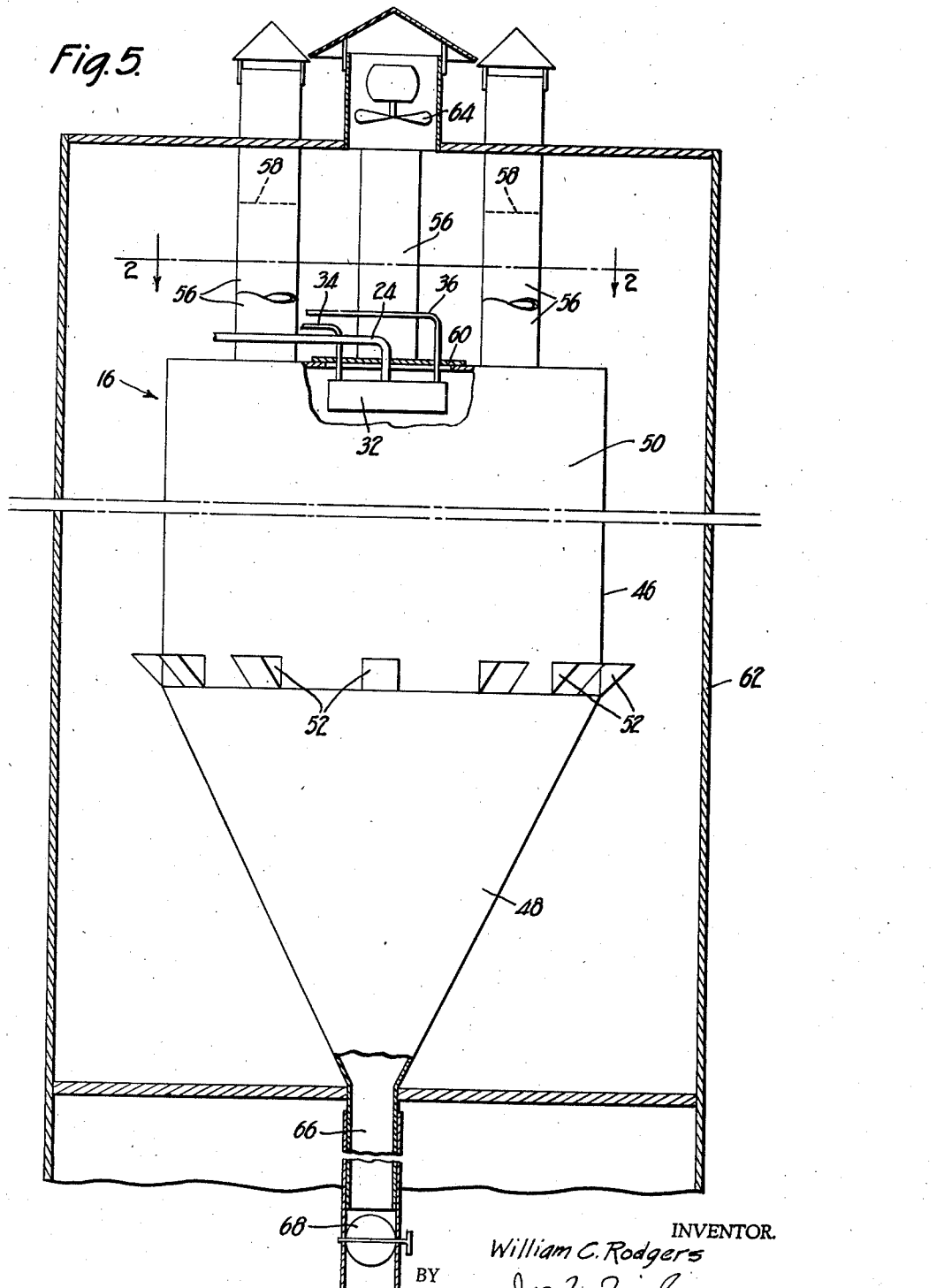
Fig. 5 is a side view of the spray tower.

The apparatus consists generally of a mixing tank 6, a filter press 8, a reservoir 10, pumps 12 and 14, and a cooling tower 16 with spray nozzles 18 at the top. All parts except the cooling tower are steam jacketed or otherwise heated to maintain the materials in fluid condition and the pumps are used not only to supply the necessary pressure to the material but also to keep the materials thoroughly mixed. The mixing tank is supplied with a manhole and charging opening 20 at the top and with an agitator 22 to mix the materials thoroughly. From the bottom of the mixing tank, the fluid materials pass through the pipe line 24 with a cock 26 to the pump 12 which forces the material through the filter press 8 from which it goes to the reservoir 10 with an agitator 28. From this reservoir the material passes through the pressure and mixing pump 14 to a spray head reservoir 30 which is also steam jacketed as at 32 with steam inlet and outlet pipes 34 and 36 and from which the spray nozzles 18 deliver the liquefied material to the cooling tower 16. The spray nozzles have threaded ends 38 by which they may be screwed into or removed from the spray head reservoir and the inside of the passage is spiralled as at 40 to give the material the whirling motion as it passes through the jet 42. The jet head 44 is removably fastened to the spray nozzle so that jet openings of different sizes may be used and with different angles of spray so that with the various pressures used, the droplets are sprayed in such a direction that they do not impinge upon the side walls 46 of the cooling tower until they are sufficiently filmed to prevent them from adhering to the walls of the tower. The tower is divided about equally into a conical portion 48 and a cylindrical portion 50. At the bottom of the cylindrical portion are louvers 52 to admit the coolant. These louvers are preferably screened as at 54 to prevent foreign matter from entering the cooling tower and also to prevent small particles of the sprayed materials from escaping into the atmosphere. At the top of the tower are a series of stacks 56, which may be equal in area to or greater or less than the area of the louvers depending upon the draft desired with different compounds and different atmospheric conditions, and preferably with screens 58 permitting the escape of the cooling fluid while holding back any of the particles. The top of the tower is provided with a cover 60 over the spray head reservoir to provide access to the reservoir. At the top of the building 62 there is preferably a ventilating fan 64 which not only ventilates the room in which the cooling chamber is situated but assists in drawing up cooling air over the outer surface of the cooling chamber, the room in which the tower is located preferably being only slightly larger than the tower. The conical portion of the tower ends in a dust tight hopper 66 for discharging the sprayed material into containers. This hopper is preferably telescoping with a damper or sluice gate 68.

The molten coating compound may be delivered to the nozzles of the above apparatus at pressures usually from 60–100 lbs. per sq. in. (the higher pressures tending to produce smaller particles), and the size of the nozzle orifices may vary in diameter from 1 mm. to 3 mm. by ½ mm. increments, although nozzle orifices as large as 5 mm. have proved practical. Other pressures may be used depending upon the compound sprayed, the apparatus used and the particle size desired. Too large nozzle orifices are undesirable with the above pressures, as it has been found that with large spherical pellets the previously mentioned advantages of materials in the pellet form tend to disappear, for instance the pellets do not shatter as readily or into as small pieces and they do not melt as quickly, and they also require such a longer time to cool that they are somewhat impractical to manufacture although they can be made with an excessively long cooling chamber and/or a refrigerated coolant.

The temperature at which the material to be sprayed is delivered, is of importance and should, in general, be as low as possible say only about 20° C. above the flow point of the material for the above apparatus. If the flow point of the material is only a few degrees, say 2° C., above the temperature of the coolant in the apparatus the material may be held at a temperature of only a few degrees C. above its flow point, say about 4° C. If, however, the flow point of the material is in the neighborhood of 100° C. above the temperature of the coolant then a larger temperature difference will be necessary, say about 20° C., between the flow point and the temperature of the material at which it is held for spraying. The tower into which the material is sprayed is maintained at a temperature of about 40° C., as a practical matter, using air at room temperature. Refrigerated coolants may be used to maintain a lower temperature if desired, having in mind that the pellets should be cooled below their adhering temperature by the time they reach the conical section of the tower or rest on one another. Also the temperature of the coolant and the temperatures in the various portions of the apparatus may be correlated to the height of the apparatus and the cooling time and size of the particles to give particles which are filmed or not and which have large or small crystal formations, as desired. Particles which are well filmed and crystallized are preferred.

In practical use the rate at which material is delivered to the nozzles varies from about 1000 lbs. to 2500 lbs an hour, depending on the viscosity of the material, size of the nozzle orifice, number of nozzles, etc. More or less material may be delivered according to the size of the orifice, pressure and viscosity, as indicated.

The cooled particles or pellets vary in size from ½ mm. to 5 mm. in diameter. They are solid, and either of spherical or slightly ovoid shape. Typical examples of materials which can be sprayed in the manner above described, and the optimum conditions for satisfactory spray cooling are as follows:

Example 1

A mixture of a flameproofing material for instance halogenated naphthalene 50 to 80 parts, a toughening agent with flameproofing characteristics for instance stearin pitch 18 to 50 parts, a softening agent which also lowers the melting point of the mixture for instance cumar resin 5 to 15 parts, an ingredient to reduce the tack of the material and resist moisture for instance 2 to 20 parts of petroleum wax and dye 1 part, was spray cooled at a pressure of about 60–70 lbs. and a temperature of about 110–120° C. to give pellets of about 1 mm. in diameter. The resulting spray cooled pellets had flow points of 70–80° C., specific gravities of 1.30–1.40 and Stormer viscosities of 10–15 at 130° C. depending upon the particular amounts of materials used. They gave no appreciable evidence of segregation on being maintained in the molten condition for one hour at 130° C. and were very uniform in composition, as shown by the following experiment. A particular sample of spray cooled material (flow point 74° C.) was maintained in a 1½" x 12" test tube for one hour at 130° C. and then cooled and sectioned. The flow point of the material of the various sections was determined and found to vary only about 1° from the initial flow point, and only about ½° throughout the length of the sample. A similar experiment was conducted on material of the same composition and initial flow point as above, but which had been cooled under agitation in a drum. In this case, after one hour's heating at 130° C., the flow point varied 3° C. from the flow point of the initial sample, and 4° C. throughout the length of the sample.

In the above example halogenated diphenyl may be used for a part of the halogenated naphthalene and rubber halide or a synthetic resin used for the stearin and cumar.

Example 2

In a typical case of wire coating in a small bath about 8 inches wide, 18 inches long and 12 inches deep, using the above material, the bath may be maintained at only about 20° C. above the point at which the composition is readily fluid, using wire at room temperature of about 20–25° C. If the wire is preheated to about 100° C., the bath may be only 5° to 10° C. above the readily fluid temperature of the materials and if the wire is cold the temperature of the bath may have to be 40 to 50° C. above its readily fluid temperature. A 76 mil. wire with a 12 mil. rubber insulation and a 25 mil. asbestos covering is passed through the bath at the rate of 1 foot every five seconds and this uses up about 50% of the bath or 20 lbs. of coating composition every hour. By using a constant stream of the herein described spray cooled material, the bath may be maintained uniform in all ways and even by introducing the material at the rate of as much as a pound every three minutes the conditions of the bath do not change substantially. When the pelleted material is introduced into the bath even so infrequently as 5 lbs. every quarter hour, there is an extraordinary improvement over introducing the same weight of material as a single lump. The pelleted material has a tendency to spread out over the surface of the bath and does not immerse as does a single lump. Therefore, the pelleted material does not materially change the temperature of the bath and such change as does occur is uniformly distributed. Also the spreading of the particles lessens the surface area from which fumes can escape and there is no deep immersion of solid material to interfere with free movement of the wire in the bath. In a molten bath of these coating materials two phenomena occur and are utilized to advantage through the use of pelleted material instead of lump material. One of these is that with the composite materials such as described in the examples, there is a tendency for the material having the greatest vapor pressure to disappear from the molten bath in the vapor form; the second of these is that the vapors carry with them their heat of vaporization. Thus when the pelleted materials spread over the surface of the bath, the composition of the bath is maintained more uniform to the extent that the escape of vapors is prevented and the heat which would ordinarily be lost in the vapors can go into melting the fresh material. As the pellets have been spray cooled and are of uniform composition, the bath is maintained of uniform composition.

From the above, the nature of the problems presented is evident as well as the objects and nature of applicant's invention and the manner in which the problems are solved. The problem of putting a uniform and homogeneous coating on wire, as well as the maintenance of uniform baths of composite materials for treating other, electrical devices, for instance the treatment of coils and particularly the impregnation of condensers, are important in themselves but it will be understood that the invention is of general scope and it is therefore desired that the invention be construed as broadly as the claims taken in conjunction with the prior art may allow.

What is claimed is:

1. Meltable compound which is solid at room temperatures comprising a plurality of ingredients at least one of which is a normally solid, toxic halogenated aromatic hydrocarbon and another of which is a normally solid ingredient of the class consisting of resins, asphalts and waxes, said ingredients being adapted to be melted together to form a homogeneous fluid mass, the proportions of the ingredients being such that when the mass is in solid condition the ingredients are present beyond their limits of mutual solubility, said compound being in the form of pellets of the solid compound and of substantially uniform composition.

2. Meltable compound which is solid at room temperatures comprising a plurality of ingredients which solidify in the compound at different temperatures, at least one of the ingredients being a normally solid, toxic halogenated aromatic hydrocarbon and another of the ingredients being a normally solid ingredient of the class of resins, asphalts and waxes, said ingredients being adapted to be melted together to form a homogeneous fluid mass, the proportions of the ingredients being such that when the mass is in solid condition the ingredients are present beyond their limit of mutual solubility, said compound being in the form of pellets of the solid compound and of substantially uniform composition with the ingredient having the highest solidifying temperature as a shell on the outside of the pellets.

3. Method of producing a solid compound containing a plurality of ingredients which are present beyond their limits of mutual solubility but which are distributed substantially uniformly through the compound, one of said ingredients being a normally solid, toxic halogenated aromatic hydrocarbon and another being a normally solid ingredient of the class consisting of resins, asphalts and waxes, which comprises mixing the ingredients in a melted state until a homogeneous mixture is obtained and spraying the melted mixture into a chamber under conditions to produce small particles and solidifying the particles thus sprayed whereby the total mass of the compound has the ingredients substantially uniformly distributed.

4. Method of producing a solid compound containing a plurality of ingredients which solidify in the compound at different temperatures and which are present beyond their limits of mutual solubility but which are distributed substantially uniformly through the compound, one of said ingredients being a normally solid, toxic halogenated aromatic hydrocarbon and another being a normally solid ingredient of the class consisting of resins, asphalts and waxes, which comprises mixing the ingredients in a melted state until a homogeneous mixture is obtained and spraying the melted mixture into a chamber under conditions to produce small whirling liquid particles and solidifying the particles thus sprayed whereby the total mass of the compound has the ingredients substantially uniformly distributed, with the ingredient having the highest solidifying temperature located as a shell on the outside of the solidified particles.

5. Method of producing a solid compound containing a plurality of ingredients one of which has a greater density than another as the compound is cooled from the melted state, said ingredients being present beyond their limits of mutual solubility but distributed substantially uniformly through the compound, one of said ingredients being a normally solid, toxic halogenated aromatic hydrocarbon and another being a normally solid ingredient of the class consisting of resins, asphalts and waxes, which comprises mixing the ingredients in a melted state until a homogeneous mixture is obtained and spraying the melted mixture into a chamber under conditions to produce small whirling liquid particles and solidifying the particles thus sprayed whereby the total mass of the compound has the ingredients substantially uniformly distributed with the ingredient having the said greater density located as a shell on the outside of the solidified particles.

WILLIAM C. RODGERS.